(12) United States Patent
Lukacik et al.

(10) Patent No.: US 11,052,791 B2
(45) Date of Patent: Jul. 6, 2021

(54) SEAT ADJUSTER

(71) Applicant: Lear Corporation, Southfield, MI (US)

(72) Inventors: Mario Lukacik, Pilsen (CZ); Pavel Valis, Pilsen (CZ); Tomas Bilek, Pilsen (CZ)

(73) Assignee: Lear Corporation, Southfield, MI (US)

( * ) Notice: Subject to any disclaimer, the term of this patent is extended or adjusted under 35 U.S.C. 154(b) by 47 days.

(21) Appl. No.: 16/689,543

(22) Filed: Nov. 20, 2019

(65) Prior Publication Data

US 2021/0146806 A1    May 20, 2021

(51) Int. Cl.
| | | |
|---|---|---|
| *B60N 2/20* | (2006.01) | |
| *B60N 2/30* | (2006.01) | |
| *B60N 2/90* | (2018.01) | |
| *B60N 2/235* | (2006.01) | |

(52) U.S. Cl.
CPC .............. *B60N 2/20* (2013.01); *B60N 2/2356* (2013.01); *B60N 2/3013* (2013.01); *B60N 2/3093* (2013.01); *B60N 2/919* (2018.02)

(58) Field of Classification Search
CPC ........ B60N 2/20; B60N 2/919; B60N 2/2356; B60N 2/3013; B60N 2/3093
See application file for complete search history.

(56) References Cited

U.S. PATENT DOCUMENTS

| | | | |
|---|---|---|---|
| 6,905,173 B2* | 6/2005 | Tame | B60N 2/20 |
| | | | 297/378.12 |
| 7,784,853 B2 | 8/2010 | Erb et al. | |
| 8,845,027 B2 | 9/2014 | Nock et al. | |
| 9,050,909 B2* | 6/2015 | Rohnert | B60N 2/20 |
| 9,061,605 B2 | 6/2015 | Hurst et al. | |
| 9,539,919 B2* | 1/2017 | Pleskot | B60N 2/02 |
| 9,987,953 B2 | 6/2018 | Kimura et al. | |
| 10,052,983 B2* | 8/2018 | Mahadik | B60N 2/30 |
| 10,421,374 B2* | 9/2019 | Pluta | B60N 2/938 |
| 10,675,996 B2* | 6/2020 | Hoyer | B60N 2/20 |
| 2001/0028189 A1* | 10/2001 | Klein | B60N 2/20 |
| | | | 297/378.12 |
| 2013/0270884 A1* | 10/2013 | Espinosa | B60N 2/2252 |
| | | | 297/378.12 |
| 2016/0257224 A1* | 9/2016 | Pluta | B60N 2/14 |
| 2018/0201163 A1 | 7/2018 | Hoyer et al. | |

\* cited by examiner

*Primary Examiner* — Philip F Gabler
(74) *Attorney, Agent, or Firm* — Fishman Stewart PLLC

(57) ABSTRACT

A seat adjuster includes an adjustable slider, a cam lever, and/or a pivot arm. The cam lever may be rotatably connected to the slider at or about a cam-slider axis such that the cam lever pivots about the cam-slider axis when the slider is adjusted. The pivot arm may have a first arm end and a second arm end disposed opposite one another. The first arm end may be rotatably connected to the cam lever at or about a cam-arm axis such that, when the slider is adjusted, (i) the cam lever pivots about the cam-arm axis and (ii) the pivot arm pivots about an arm-housing axis extending through the second arm end.

20 Claims, 13 Drawing Sheets

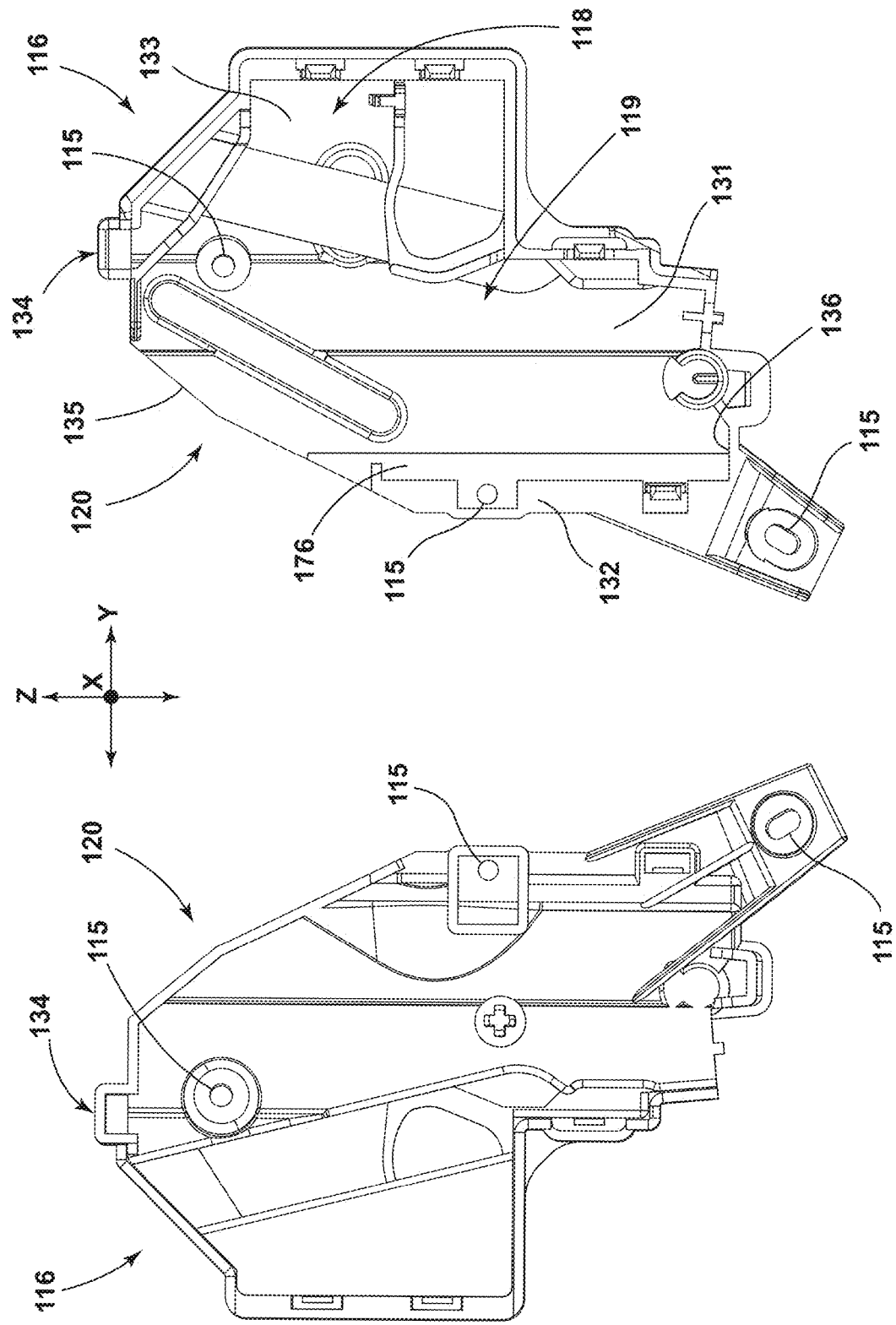

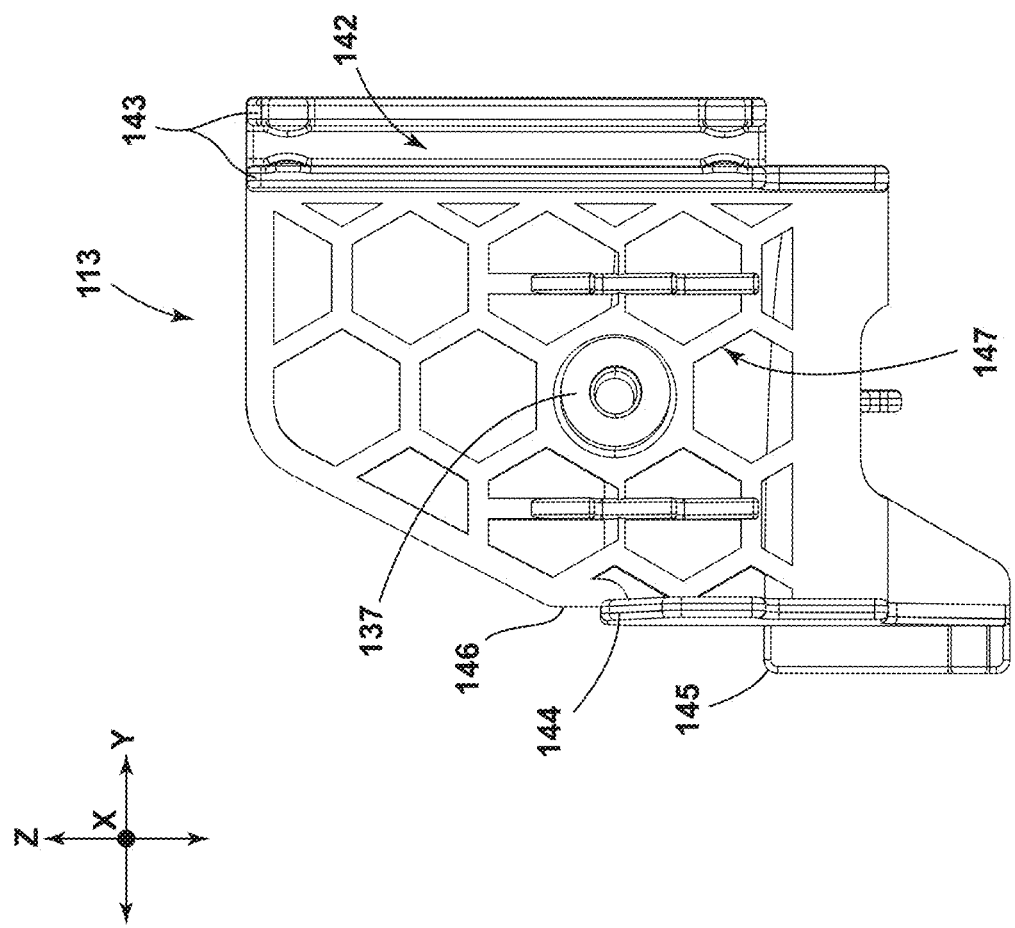
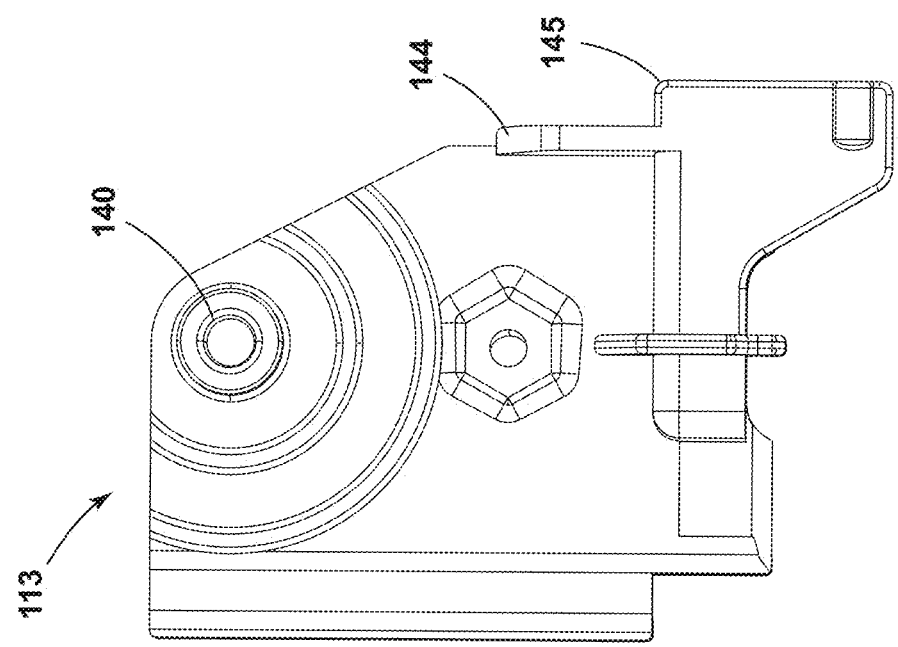
FIG. 6B
FIG. 6A

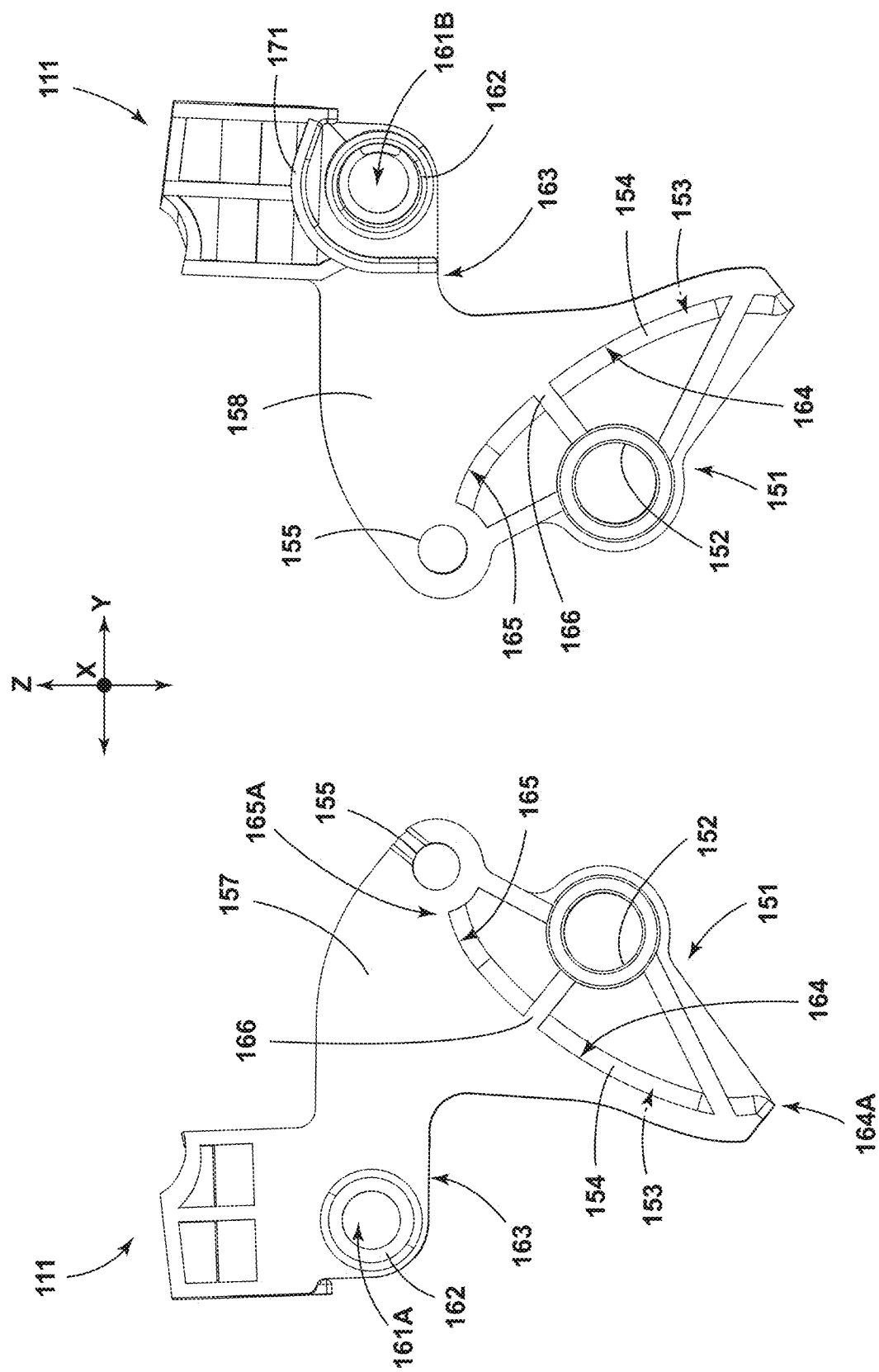

SEAT ADJUSTER

TECHNICAL FIELD

The present disclosure generally relates to a seat adjuster for seat assemblies, including seat assemblies in vehicles, and a seat assembly with a seat adjuster.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Some seat adjusters may be relatively difficult to use, may require a relatively large amount of force to actuate, and/or may include an actuation force that greatly fluctuates during the actuation process.

There is a desire for solutions/options that address, minimize, and/or eliminate one or more challenges or shortcomings of seat adjusters and seat assemblies. The foregoing discussion is intended only to illustrate examples of the present field and is not a disavowal of scope.

SUMMARY

In embodiments, a seat adjuster may include an adjustable slider, a cam lever, and/or a pivot arm. The cam lever may be rotatably connected to the slider at a cam-slider axis such that the cam lever pivots about the cam-slider axis when the slider is adjusted. The pivot arm may have a first arm end and a second arm end that may be disposed opposite one another. The first arm end may be rotatably connected to the cam lever at a cam-arm axis such that, when the slider is adjusted, (i) the cam lever is configured to pivot about the cam-arm axis and (ii) the pivot arm is configured to pivot about an arm-housing axis extending through the second arm end.

With embodiments, a seat adjuster may include a housing, a handle, a slider, a cam lever, and/or a pivot arm. The housing may include a handle opening. The slider may be adjustably disposed within the housing and may be adjustable to a retracted position and an extended position. The handle may be connected to the slider and at least a portion of the handle may project from the housing via the handle opening. The slider may be adjustable via the handle. The cam lever may be rotatably connected to the slider at a cam-slider axis such that the cam lever pivots about the cam-slider axis when the slider is adjusted. The pivot arm may have a first arm end and a second arm end disposed opposite one another. The first arm end may be rotatably connected to the cam lever at a cam-arm axis such that the cam lever pivots about the cam-arm axis when the slider is adjusted. The second arm end may be rotatably connected to the housing at an arm-housing axis such that the pivot arm pivots about the arm-housing axis when the slider is adjusted. The slider, the cam lever, and the pivot arm may be configured such that (i) the cam-arm axis is disposed at a vertical level between the cam-slider axis and the handle opening when the slider is in the retracted position, and/or (ii) the cam-slider axis is disposed at a vertical level between the cam-arm axis and the handle opening when the slider is in the extended position.

The foregoing and other potential aspects, features, details, utilities, and/or advantages of examples/embodiments of the present disclosure will be apparent from reading the following description, and from reviewing the accompanying drawings.

BRIEF DESCRIPTION OF THE DRAWINGS

FIGS. 5A and 5B are an outer side view and an inner side view, respectively, generally illustrating of an embodiment of an inner housing part of a seat adjuster according to teachings of the present disclosure.

FIGS. 6A and 6B are a front view and a rear view, respectively, of an embodiment of a slide of a seat adjuster according to teachings of the present disclosure.

FIGS. 7A and 7B are a front view and a rear view, respectively, of an embodiment of a cam lever of a seat adjuster according to teachings of the present disclosure.

DETAILED DESCRIPTION

Reference will now be made in detail to embodiments of the present disclosure, examples of which are described herein and illustrated in the accompanying drawings. While the present disclosure will be described in conjunction with embodiments and/or examples, it will be understood that they do not limit the present disclosure to these embodiments and/or examples. On the contrary, the present disclosure covers alternatives, modifications, and equivalents.

Figure 1:
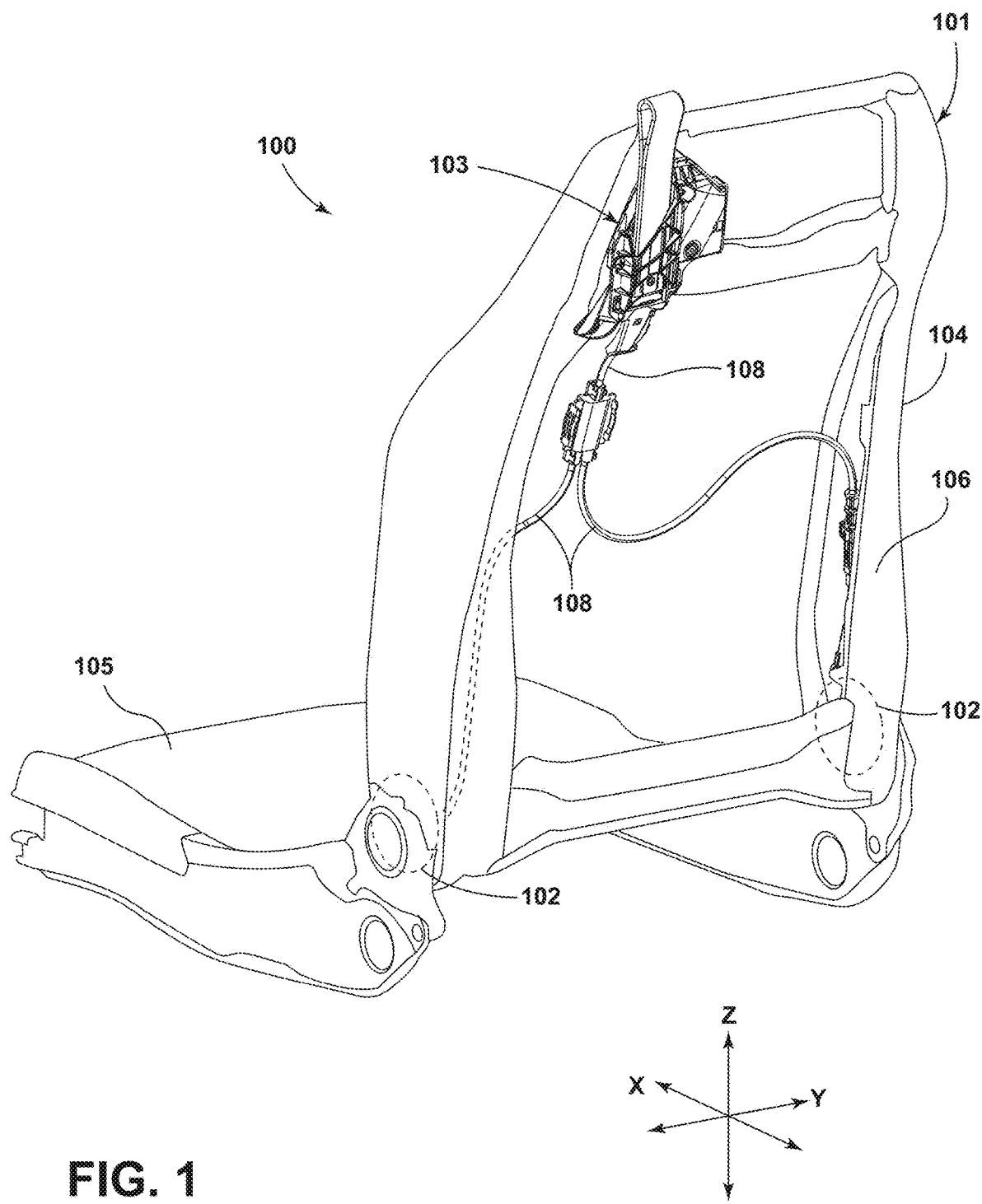
FIG. 1 is a perspective view generally illustrating an embodiment of a seat adjuster according to teachings of the present disclosure.

In embodiments, such as generally illustrated in FIG. 1, a seat assembly 100 may include a seat 101, an adjustment mechanism 102, and/or a seat adjuster 103.

With embodiments, the seat 101 may include a seat frame 104, a seat base 105, and/or a seat back 106. The seat base 105 and the seat back 106 may be connected to and/or disposed on the seat frame 104 and supported by the seat frame 104. The seat frame 104, the seat base 105, and/or the seat back 106 may be configured to adjust, move, recline, rotate, fold, collapse, etc. via actuation of the adjustment mechanism 102.

In embodiments, the adjustment mechanism 102 may be connected to the seat 101, the seat frame 104, and/or a component thereof. The adjustment mechanism 102 may facilitate, initiate, and/or otherwise perform adjustment of one or more characteristics of the seat 101, such as position, reclining angle, and/or firmness, among others. In some embodiments, the adjustment mechanism 102 may include a seat recliner, a seat position adjuster, a track assembly, a support adjuster, a locking mechanism, and/or an easy entry system, for example and without limitation. To actuate the adjustment mechanism 102, a force equal to or greater than a threshold force may be applied to the adjustment mechanism 102, for example, by a cable 108. The adjustment mechanism 102 may or may not actuate the instant a threshold force is applied. In some embodiments, to fully actuate the adjustment mechanism 102, a force equal to or greater than the threshold force be continuously applied to the adjustment mechanism 102 to actuate the adjustment mechanism 102 along an actuation trajectory. A threshold force profile 107 may be a function of a threshold force and an actuation trajectory (see, e.g., FIG. 10). For example, the adjustment mechanism 102 may have an actuation trajectory of approximately 28 mm, may involve a minimum movement range of 16 mm to be unlocked (e.g., unlock a position of the seat 101), and a movement range of the full 28 mm to fully actuate the adjustment mechanism 102 and bring the seat 101 to a desired position, such as a collapsed position. The threshold force, however, may or may not be constant along the actuation trajectory. For instance, in the embodiment generally illustrated in FIG. 10, the threshold force to actuate the adjustment mechanism 102 at 1.1 mm of the actuation trajectory may be approximately 150 N, while the threshold force to actuate the adjustment mechanism 102 at approximately 4 mm may be approximately 54 N, for example and without limitation. This fluctuation, deviation, and/or variation in the threshold force along the actuation trajectory (e.g., in the threshold force profile 107) may complicate operation of the adjustment mechanism 102 and/or may frustrate users.

With embodiments, the adjustment mechanism 102 may be operatively connected to the seat adjuster 103 such that the adjustment mechanism 102 may be actuated by the seat adjuster 103. One or more cables 108 (e.g., Bowden cables) may operatively connect the seat adjuster 103 and the adjustment mechanism 102. At least one of the cables 108 may be structured independently of the adjustment mechanism 102 and/or the seat adjuster 103. Additionally and/or alternatively, at least one of the cables 108 may be a component of the adjustment mechanism 102 and/or the seat adjuster 103. Some embodiments may include multiple adjustment mechanisms 102 and/or multiple seat adjusters 103. Multiple adjustment mechanisms 102 may be operatively connected to a single seat adjuster 103 or individually connected to a respective seat adjuster 103 of the multiple of seat adjusters 103. In one illustrative example, a seat assembly 100 may have several adjustment mechanisms 102 including a seat recliner, a track assembly, and a locking mechanism, each of which may be operatively connected to the same seat adjuster 103 such that operation of the seat adjuster 103 actuates (e.g., substantially simultaneously) the locking mechanism, the seat recliner, and the track assembly unlocking the position of the seat 101, folding the seat back 106 toward the seat base 105, and/or sliding the seat 101 forward.

Figure 2A:
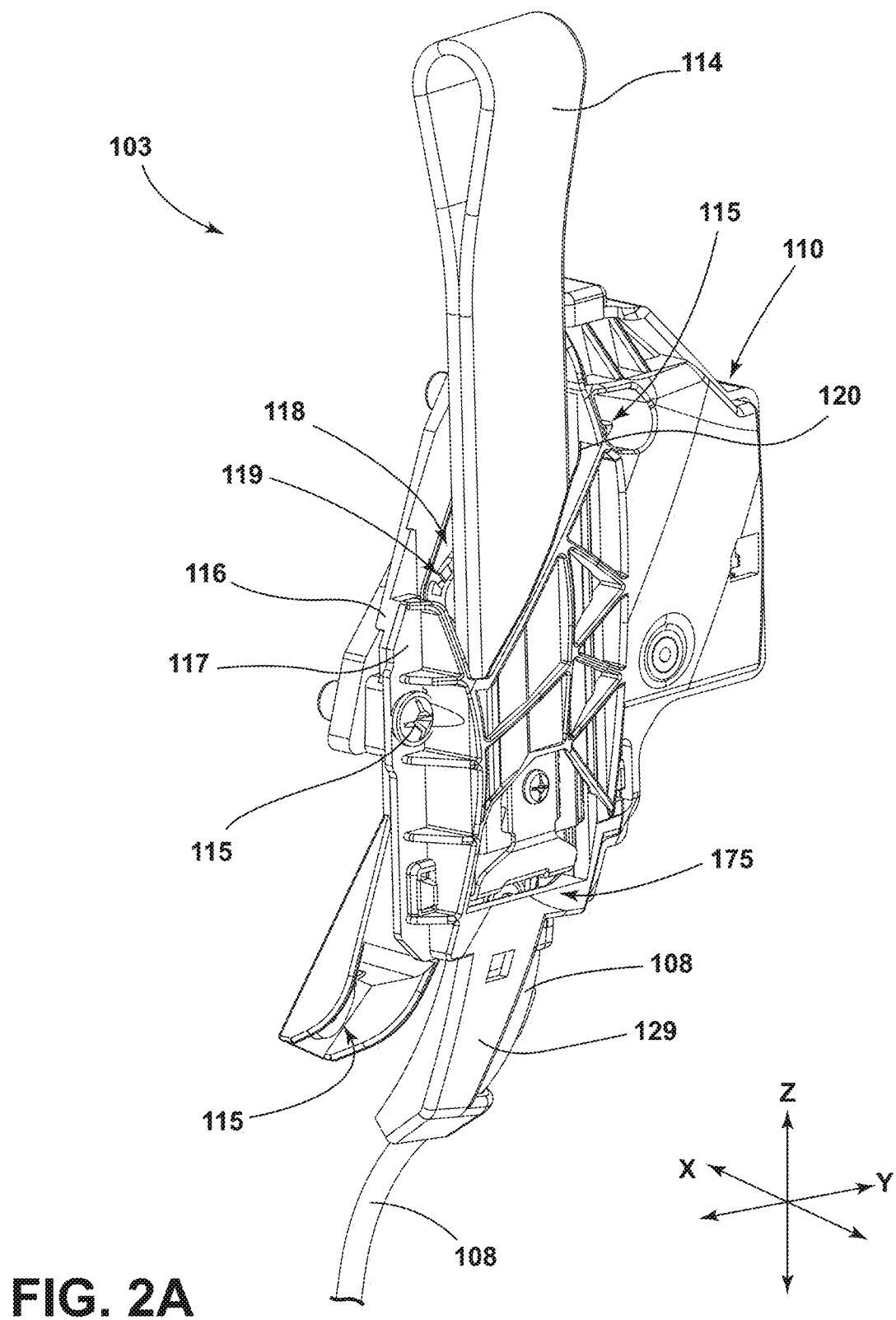
FIG. 2A is a perspective view generally illustrating an embodiment of a seat adjuster according to teachings of the present disclosure.
Figure 2B:
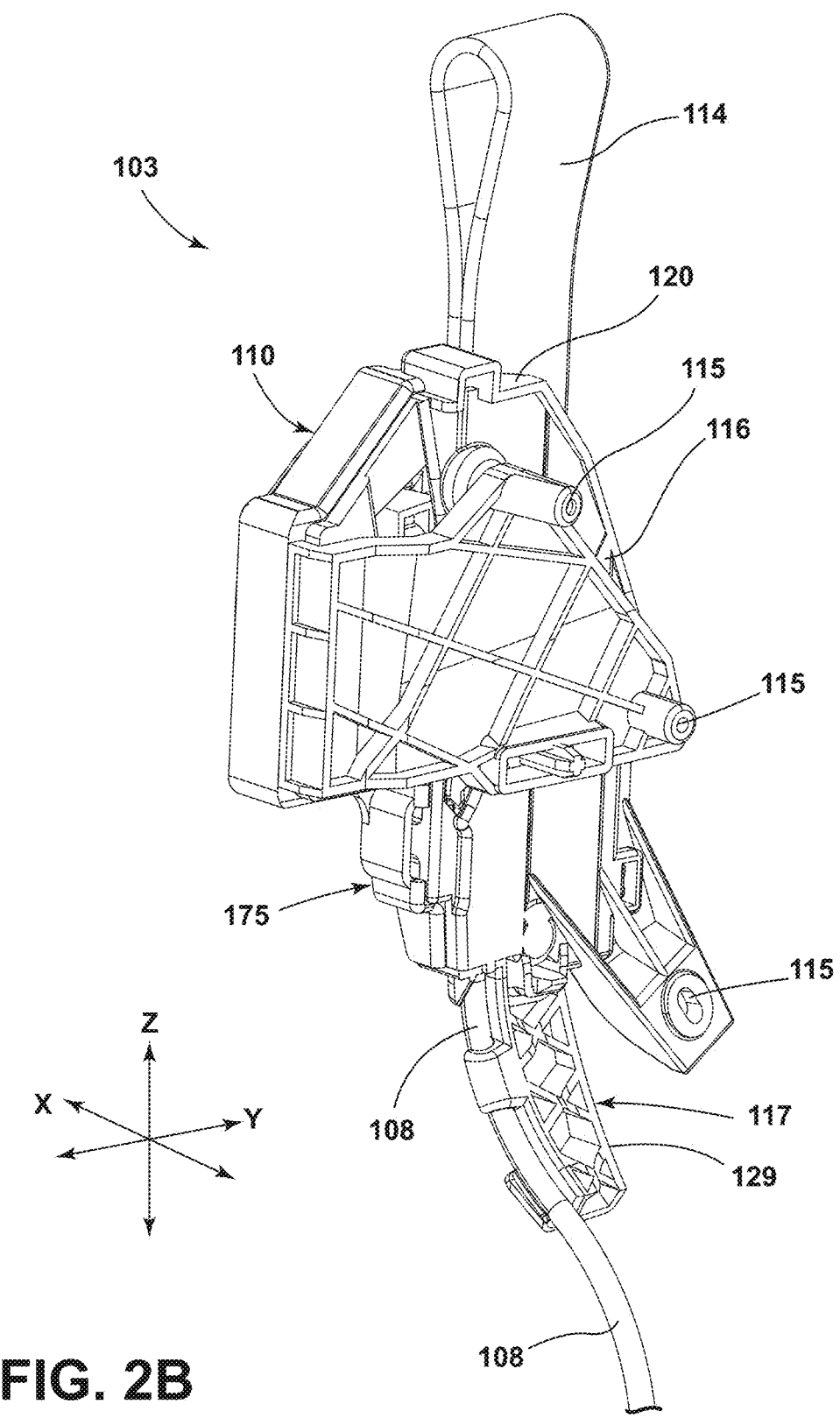
FIG. 2B is a perspective view generally illustrating an embodiment of the seat adjuster according to teachings of the present disclosure.
Figure 10:
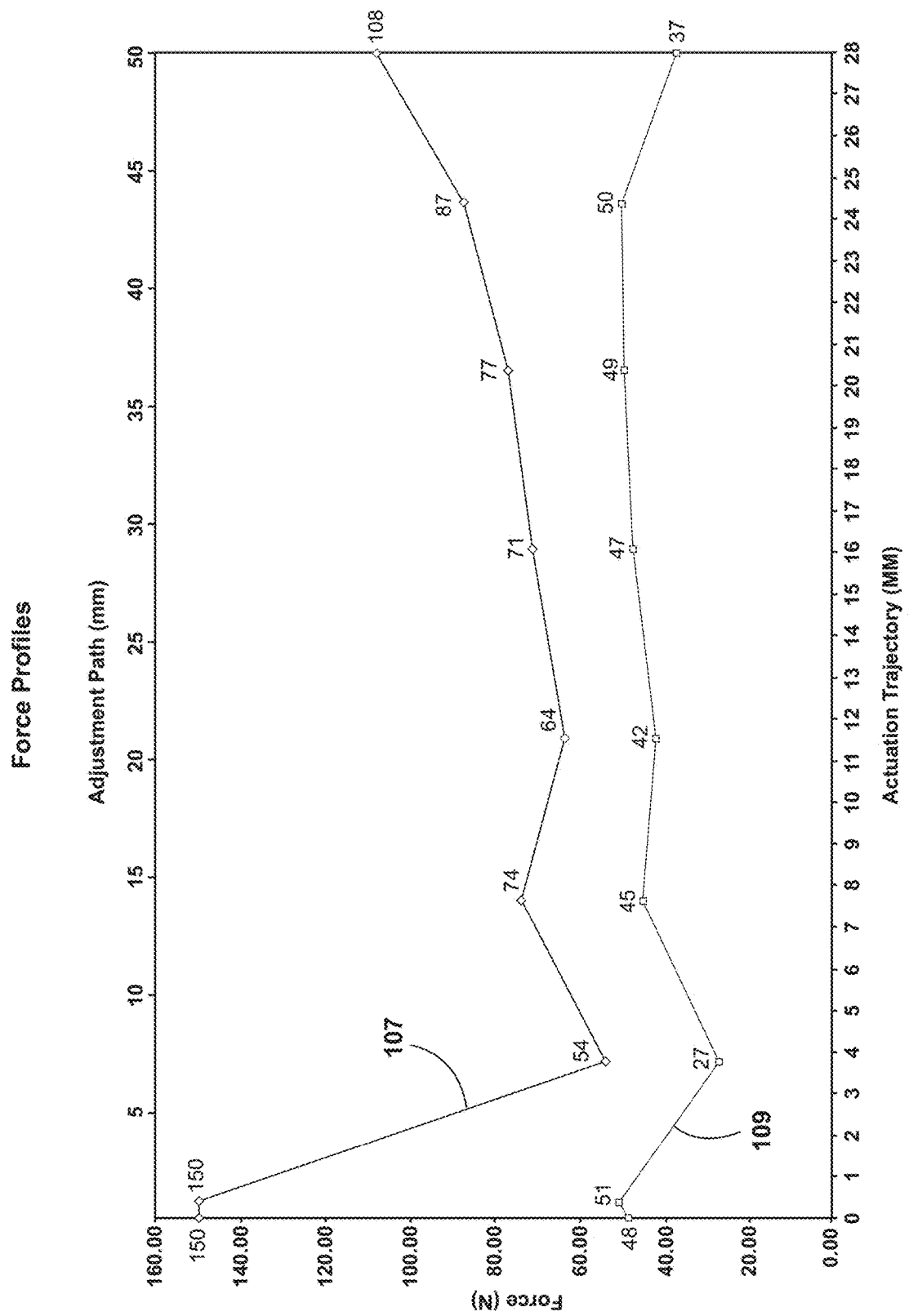
FIG. 10 is a graphic representation generally illustrating an input force profile and a threshold force profile relative to the actuation trajectory and the adjustment path of the slider corresponding to an embodiment of a seat adjuster.

In some embodiments, such as generally illustrated in FIGS. 2A and 2B, the seat adjuster 103 may be configured to receive an input force and transfer the force, for example, to the adjustment mechanism 102. Like the threshold force, a minimum input force may need to be applied (e.g., continuously) to the seat adjuster 103 to actuate the adjustment mechanism 102. A plot of the input force along the actuation trajectory may define an input force profile 109, such as generally depicted in FIG. 10. In this way, the seat adjuster 103 may facilitate actuation of the adjustment mechanism 102. Additionally and/or alternatively, the input force may be provided by a user actuating a handle 114, lever, or other component of the seat adjuster 103. The input force may also be provided by a machine or device in response to receiving a signal, which may be sent when a user presses a button or flips a switch, for example.

In embodiments, a seat adjuster 103 may be configured to modify/transform the input force. For example, the seat adjuster 103 may be configured to transform and/or amplify the input force such that (i) an input force that is lower than the threshold force may actuate the adjustment mechanism 102, and/or (ii) fluctuation, deviation, and/or variation of the input force profile 109 is lower or less pronounced than the fluctuation, deviation, and/or variation of the threshold force profile 107. In some embodiments, the seat adjuster 103 may be configured such that the input force does not exceed, for example, approximately 55 N at any point of the input force profile 109 regardless of the threshold force (e.g., even for threshold forces of about 150 N). The seat adjuster 103 may be configured such that the input force varies between approximately 50 N to 25 N across the actuation trajectory.

In embodiments, the seat adjuster 103 may be connected to the seat 101 and/or the seat frame 104, such as generally illustrated in FIG. 1. In some embodiments, the seat adjuster 103 may be disposed on, at, or about an upper end of the seat frame 104. The seat adjuster 103 may be connected to other locations on the seat 101 and/or seat frame 104 where the seat adjuster 103 and/or a handle 114 thereof may be readily accessible by a user or operator, such as at a side of the seat 101 and/or seat frame 104.

Figure 3:
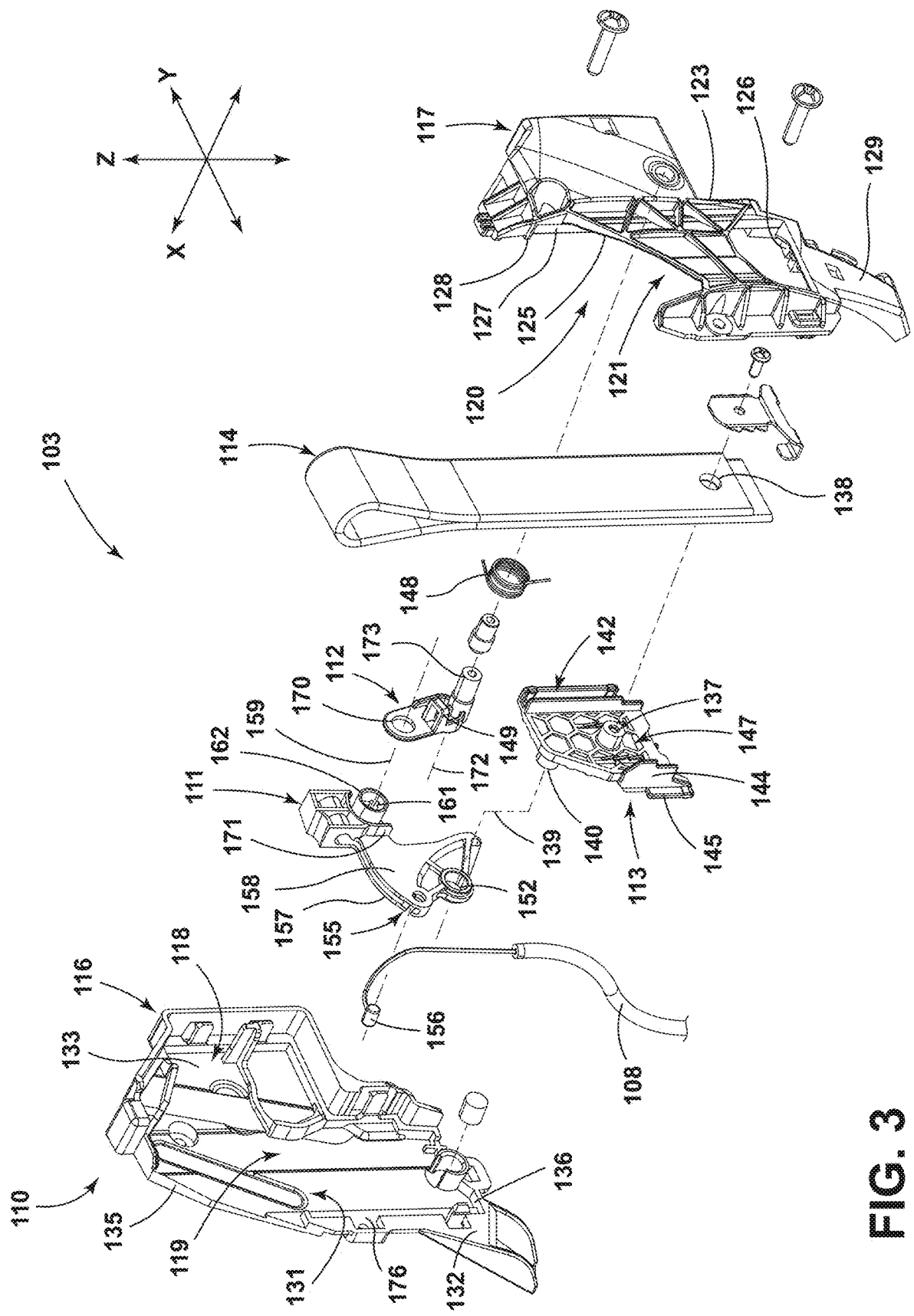
FIG. 3 is an exploded view generally illustrating an embodiment of a seat adjuster according to teachings of the present disclosure.

With embodiments, such as generally illustrated in FIG. 3, the seat adjuster 103 may include a housing 110, a cam lever 111, a pivot arm 112, a slider 113, and/or a handle 114. The cam lever 111, the pivot arm 112, the slider 113, and/or the handle 114 may be at least partially disposed within the housing 110. In embodiments, the cam lever 111, the pivot arm 112, and the slider 113 may be configured such that the seat adjuster 103 is configured as a scotch yoke mechanism.

In some embodiments, like the one shown in FIGS. 2A and 2B, the housing 110 may include a plurality of mounting holes 115, which may extend therethrough. The mounting holes 115 may be configured to receive and/or facilitate the through passage of a screw, bolt, nail, or other structure for securing the seat adjuster 103 to the seat 101 and/or the seat frame 104. The housing 110 may include an inner housing part 116 and an outer housing part 117 that may be connected together. When connected to the seat 101 and/or the seat frame 104, the inner housing part 116 may be arranged in abutment with the seat 101 and/or the seat frame 104 and may be disposed between the seat 101 and/or the seat frame 104 and the outer housing part 117. The housing 110 may define an interior space 118 disposed between the inner housing part 116 and the outer housing part 117. The interior space 118 of the housing 110 may include an adjustment space 119 that may be configured to at least partially receive and/or to retain the slider 113. The housing 110 may include a handle opening 120 that may connect the adjustment space 119 to an exterior space surrounding the seat adjuster 103.

Figure 4A:
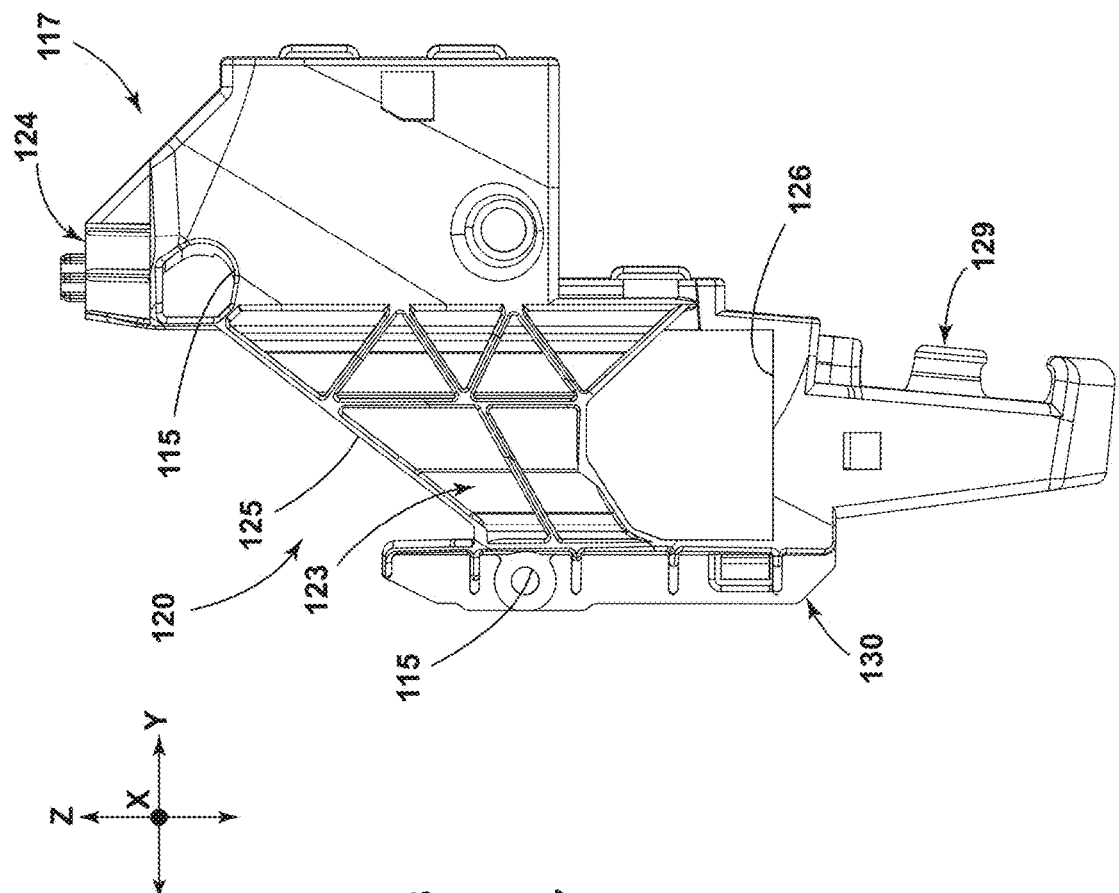
FIGS. 4A and 4B are an inner side view and an outer side view, respectively, generally illustrating of an embodiment of an outer housing part of a seat adjuster according to teachings of the present disclosure.
Figure 4B:
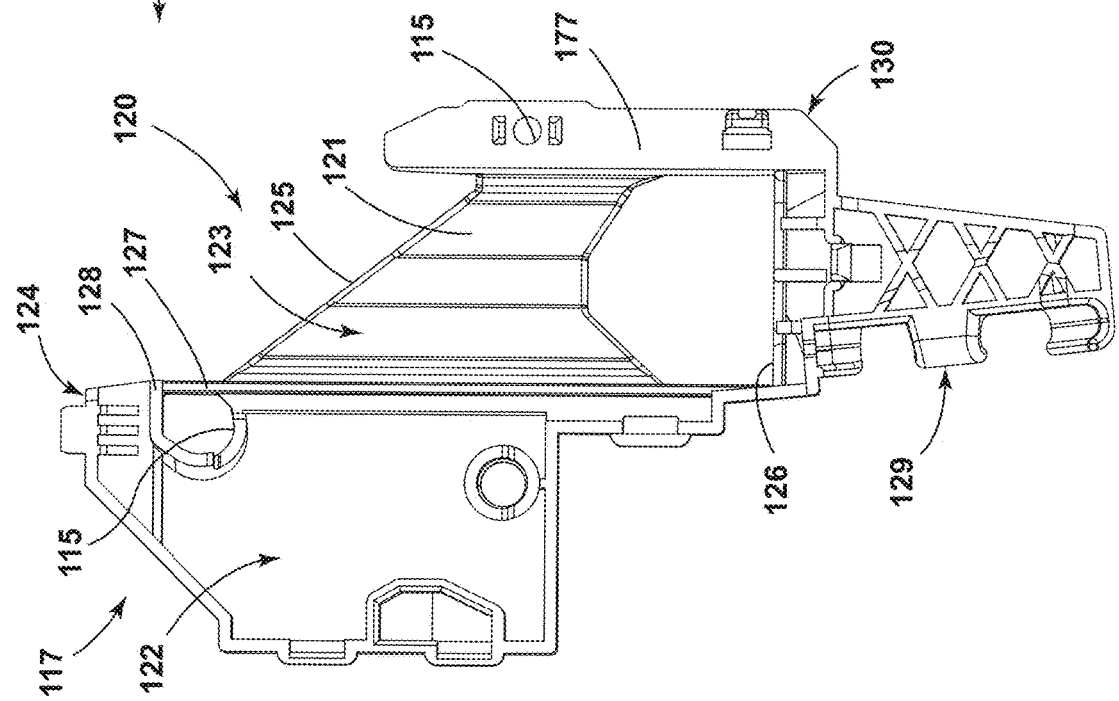

In embodiments, such as generally depicted in FIGS. 3, 4A, and 4B, the outer housing part 117 may define an outer contour 121 that may extend vertically in the Z-direction (e.g., when the seat back 106 is aligned with the Z-direction). The outer housing part 117 may include an inward facing surface 122 and/or a bulge or extended portion 123. The outer contour 121 may extend to an upper edge 124 of the outer housing part 117, such as to form a first opening portion 125 of the handle opening 120. The outer housing part 117 may include a first bearing portion 126 disposed at an opposite end of the outer contour 121 than the first opening portion 125. The outer housing part 117 may include a guide 127 that may be configured for guiding the slider 113 along an adjustment path 160 of the slider 113. The guide 127 may include one or more of a variety of configurations, such as a guide protrusion, a guide body, and/or a guide rail, for example. The guide 127 may by disposed on and/or project from the inward facing surface 122 of the outer housing part 117 and may be arranged adjacent to the outer contour 121. The guide 127 may extend linearly and/or non-linearly along the inward facing surface 122 of the outer housing part 117. The guide 127 may, for example, be disposed directly adjacent to the outer contour 121 relative to the Y-direction and/or a portion of the guide 127 may at least partially define the outer contour 121. In some embodiments, the guide 127 may extend from the first bearing portion 126 to the first opening portion 125. The outer housing part 117 may include a stop 128 that may be configured to limit movement of the slider 113 and/or prevent the slider 113 from being removed through the handle opening 120. In some embodiments, the stop 128 may include a protrusion or body disposed near the upper edge 124 of the outer housing part 117. The stop 128 may be aligned with the guide 127, may be connected to the guide 127, and/or may be formed as an extended portion of the guide 127. The outer housing part 117 may include a cable track 129 through which the cable 108 connecting the seat adjuster 103 and the adjustment mechanism 102 may enter/exit the housing 110. The cable track 129 may be disposed at a lower end 130 of the outer housing part 117 relative to the Z-direction, may be configured to receive at least a portion of the cable 108, and/or may retain the cable 108 in proper position within the housing 110.

With embodiments, the inner housing part 116 may define an inner contour 131 extending vertically in the Z-direction as shown in FIGS. 3, 5A, and 5B. The inner contour 131 may be formed or disposed in an inward facing surface 132 of the inner housing part 116 and/or may be defined by an inward facing surface(s) of a bulge or extended portion 133 of the inner housing part 116. The inner contour 131 may extend to an upper edge 134 of the inner housing part 116 to form a second opening portion 135 of the handle opening 120. The inner housing part 116 may include a second bearing portion 136 disposed at an opposite end of the inner contour 131 than the second opening portion 135.

In some embodiments, the inner contour 131 and the outer contour 121 may be complimentary and/or disposed in alignment with one another such that, when the inner housing part 116 and the outer housing part 117 are connected to one another, (i) the inner contour 131 and the outer contour 121 may together define the adjustment space 119, (ii) the first opening portion 125 and the second opening portion 135 may together define the handle opening 120, and/or (iii) the first bearing portion 126 and the second bearing portion 136 may together define a bearing portion 175 of the housing 110. An exemplary inner housing part 116 and outer housing part 117 connected to one another to form the housing 110 is generally depicted in FIGS. 1, 2A, and 2B.

With embodiments, such as generally illustrated in FIGS. 3, 6A, and 6B, the slider 113 may be connected to the handle 114 and may be adjusted within the housing 110 via the handle 114. The slider 113 may be connected to the handle 114 in a variety of ways, such as, by a screw, adhesive, a snap-in connection, or a male-female adaptor. The handle 114 may include one or more of a variety of shapes, sizes, configurations, and/or materials and may be configured to be actuated by a user. For example and without limitation, the handle 114 may be an elongated bar, a strap, and/or or a looped strap and may project out of the housing 110, such as through the handle opening 120. The slider 113 may include at least one handle protrusion 137 for connecting the slider 113 to the handle 114. The handle protrusion 137 may be disposed on and/or project from a surface of the slider 113 and may be configured to be received within at least one complimentary receptacle of the handle 114. For example, as generally illustrated in FIGS. 3 and 6B, the handle protrusion 137 may be a cylindrical body that may be received and/or retained in a handle receptacle 138 of the handle 114.

In some embodiments, such as generally illustrated in FIGS. 3, 6A, and 6B, the slider 113 may be connected to the cam lever 111 at a cam-slider axis 139 (also referred to as the C-S axis). The slider 113 may be connected to the cam lever 111 in a manner that may allow for the cam lever 111 to rotate as the slider 113 is adjusted, which may include connecting the slider 113 directly or indirectly to the cam lever 111. The slider 113 may include a slider protrusion 140 for connecting the slider 113 to the cam lever 111. The slider protrusion 140 may be disposed on and/or project from a surface of the slider 113 and may be configured to be received within at least one complimentary slider receptacle 152 of the cam lever 111. As shown generally illustrated in FIGS. 3 and 6A, the slider protrusion 140 may be a cylindrical body and may extend substantially coaxially with the C-S axis 139, such as to facilitate rotation of the cam lever 111 about the slider protrusion 140. The handle protrusion 137 and the slider protrusion 140 may be disposed on and/or project from opposing surfaces of the slider 113 and may extend in opposite directions.

Figure 9A:
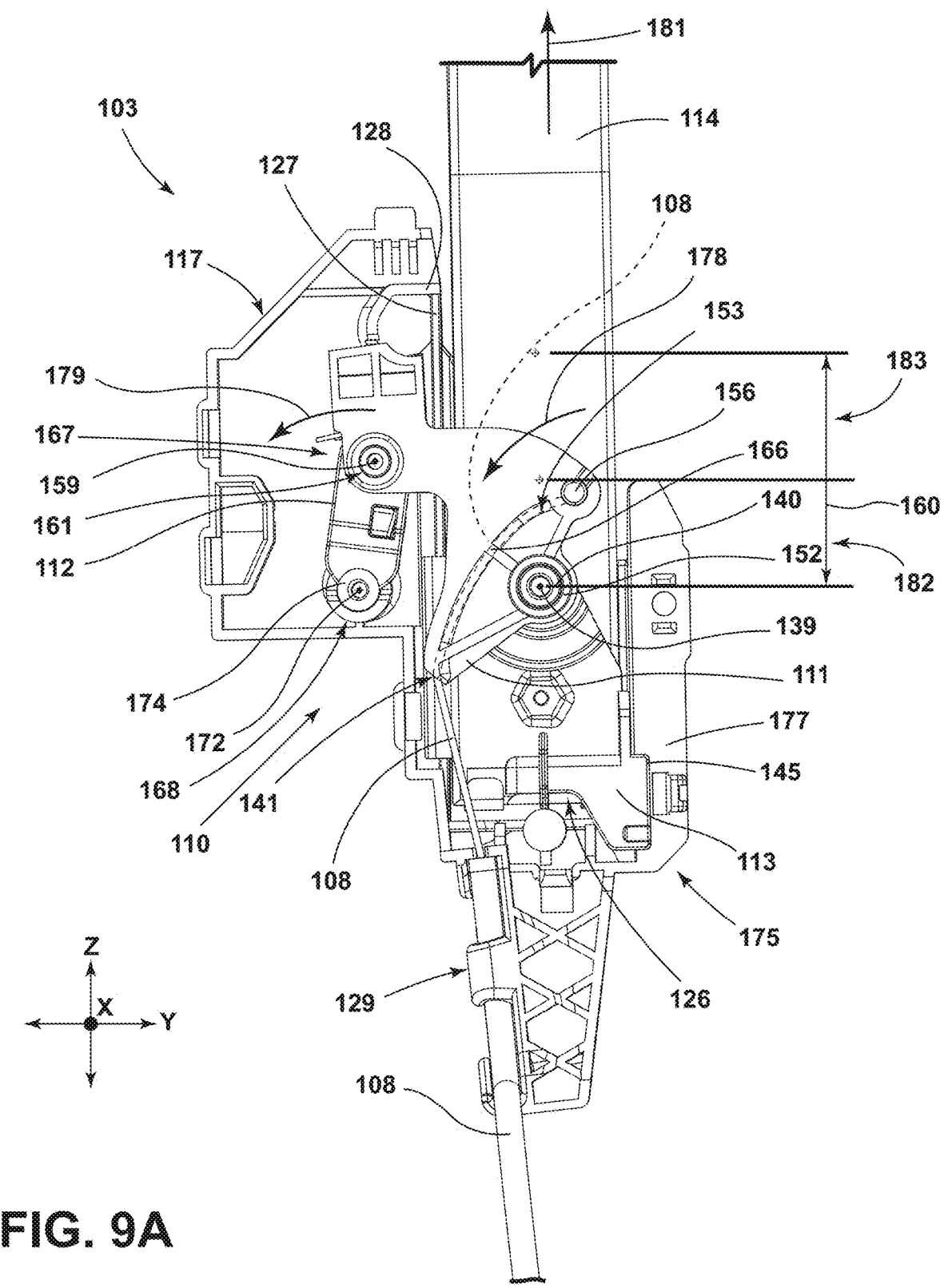
FIG. 9A generally illustrates a cross-sectional view of an embodiment of a seat adjuster, with a slider in a retracted position, according to teachings of the present disclosure.
Figure 9B:
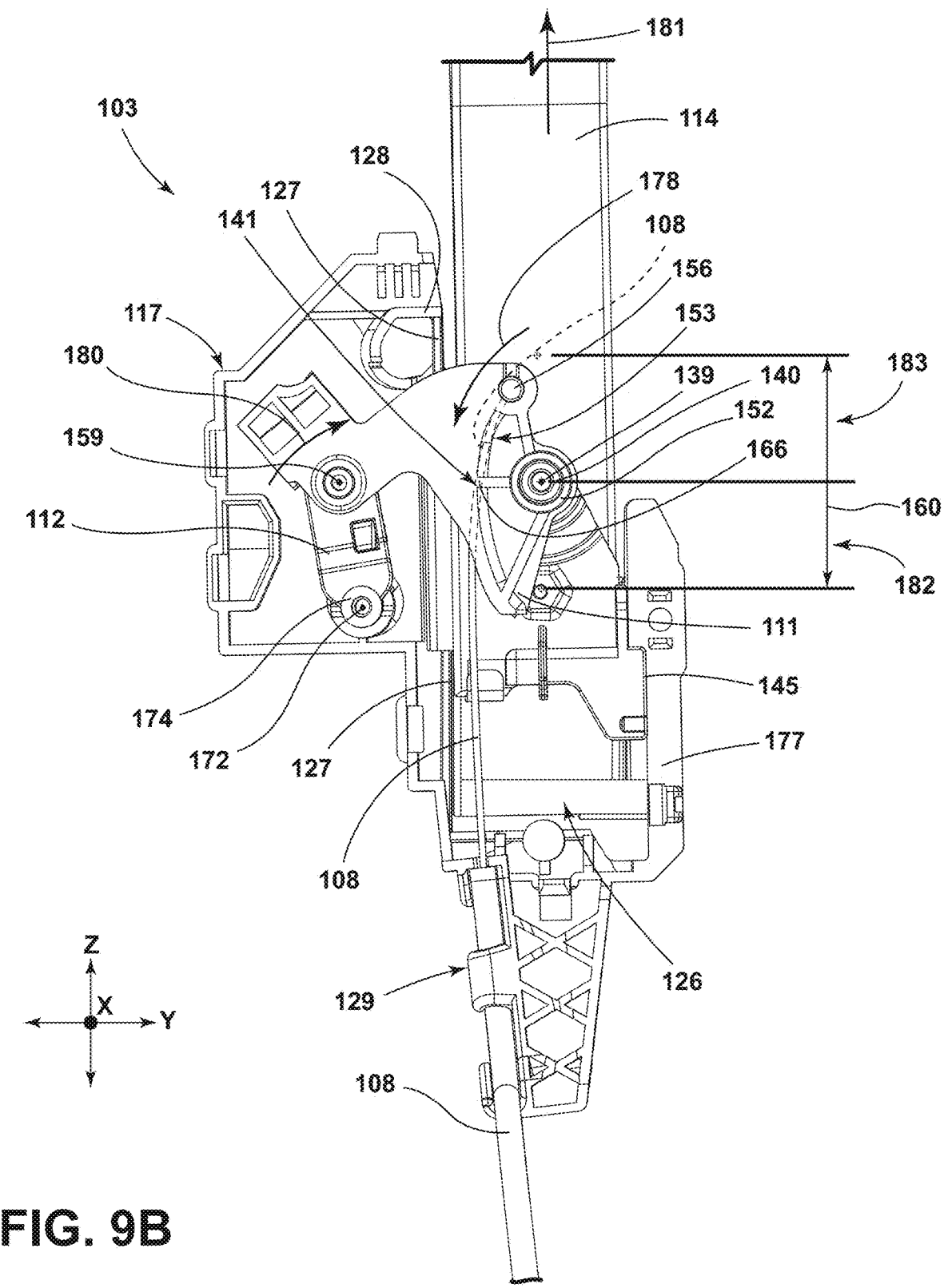
FIG. 9B generally illustrates a cross-sectional view of an embodiment of a seat adjuster, with a slider is in an intermediate position, according to teachings of the present disclosure.
Figure 9C:
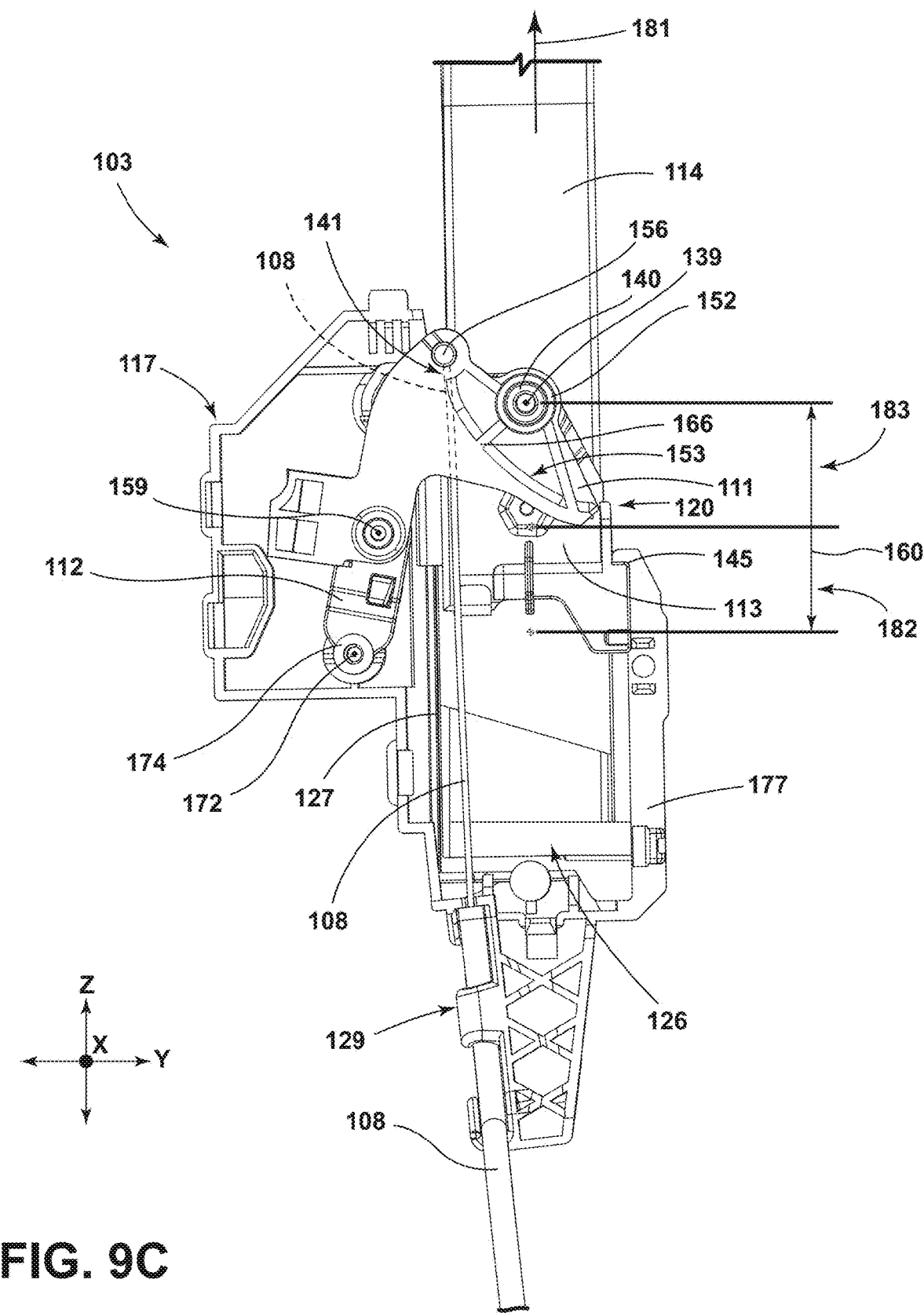
FIG. 9C generally illustrates a cross-sectional view of an embodiment of a seat adjuster, with a slider in an extended position, according to teachings of the present disclosure.

In embodiments, such as generally illustrated in FIGS. 9A, 9B, and 9C, the slider 113 may interact or engage with the housing 110. The slider 113 may include a slider groove 142 configured to engage the guide 127 of the outer housing part 117, such as generally depicted in FIGS. 6A and 6B. The slider groove 142 may extend in a manner complimentary to the adjustment path 160 and/or may be disposed at or near a lateral edge of the slider 113 and may extend substantially in the Z-direction. In some embodiments of a slider 113, such as those generally illustrated in FIG. FIGS. 3 and 6B, the slider groove 142 may be defined by a space between at least two guide protrusions 143 projecting from a surface of the slider 113 facing the outer housing part 117. In other embodiments, the slider groove 142 may be disposed directly in the surface of the slider 113 facing the outer housing part 117. The slider 113 may also include a one or more flanges for aligning the slider 113 within the housing 110 and guiding the slider 113 during adjustment. For example, the slider 113 may include a first flange 144 projecting from the slider 113 in a direction of the outer housing part 117. The first flange 144 may be disposed at a lateral edge 146 of the slider 113 opposite the slider groove 142. In some embodiments, the first flange 144 and at least one of the two guide protrusions 143 defining the slider groove 142 may at least partially define a handle space 147 in which the handle 114 may be disposed when connected to the slider 113. When the slider 113 is disposed within the housing 110, the first flange 144 may be configured to interact with the outer contour 121 to guide the slider 113 along the adjustment path 160 during adjustment. Additionally and/or alternatively, some exemplary embodiments of the slider 113 may include a second flange 145 extending from a lateral edge 146 of the slider 113 in the Y-direction. To ensure the slider 113 maintains proper positioning relative to the X-direction during adjustment, the second flange 145 may be configured to be disposed (e.g., sandwiched) between opposing flange support surfaces 176, 177 of the inner housing part 116 and the outer housing part 117 facing in the X-direction such that the second flange 145 may be able to slide therebetween in the Z-direction.

With embodiments, the slider 113 may be disposed at least partially within the adjustment space 119 of the housing 110. The slider 113 may be disposed such that the slider groove 142 engages the guide 127 of the outer housing part 117, the first flange 144 interacts with the outer contour 121, and/or the second flange 145 is disposed at least partially between opposing flange support surfaces 176, 177 of the inner housing part 116 and the outer housing part 117. As shown in the illustrative embodiments in FIGS. 9A-9C, the guide 127 of the outer housing part 117 may be disposed at least partially in the slider groove 142, and the first flange 144 may abut against the outer contour 121. The slider 113 may be adjusted along an adjustment path 160 from a retracted position, such as generally shown in FIG. 9A, to an extended position, such as generally shown in FIG. 9C, and from the extended position to the retracted position. In the retracted position, the slider 113 may rest against and/or abut a bearing portion 175 of the housing 110. In the extended position, the slider 113 may be disposed at or about the handle opening 120 and may, in some embodiments, at least partially protrude from the handle opening 120. In some embodiments, a return spring 148 may be connected to the pivot arm 112 and the housing 110 via spring retainers 149, 150, which may bias the slider 113 in the retracted position.

With some embodiments, such as generally illustrated in FIGS. 3, 7A, and 7B, a cam lever 111 may be connected to a slider 113 at the C-S axis 139. The cam lever 111 may have a main portion 151 including a slider receptacle 152 configured to receive and retain the slider protrusion 140 of the slider 113. The slider receptacle 152 may extend through the cam lever 111 in the X-direction and may be coaxial with the C-S axis 139. The cam lever 111 may include a cable guiding surface 153, which may extend in a circumferential direction relative to the slider receptacle 152 and which may generally face away from the slider receptacle 152 in a direction lying in a Y-Z plane (e.g., the cable guiding surface 153 may be an outward facing radial surface). The cable guiding surface 153 may include a groove 154 configured to at least partially receive the cable 108. The cam lever 111 may include a knot receptacle 155 that may be configured to receive and/or retain a cable knot 156 that may be disposed at an end of the cable 108. The knot receptacle 155 may be disposed at or about an end of the cable guiding surface 153 such that, when the cable knot 156 of the cable 108 is retained in the knot receptacle 155, the cable 108 projects from the knot receptacle 155 and a portion of the cable 108 lies on and/or extends along the cable guiding surface 153. At a tangent point 141, the cable 108 may diverge from the cable guiding surface 153, extend to the cable track 129, project out of the housing 110 via the cable track 129, and/or connect to the adjustment mechanism 102 (see, e.g., FIGS. 9A-9C).

In some embodiments, such as generally illustrated in FIGS. 7A and 7B, a cam lever 111 may include an inner cam wall 157 and/or an outer cam wall 158 lying in the Y-Z plane. The inner cam wall 157 and the outer cam wall 158 may be disposed on opposite sides of the cable guiding surface 153 relative to the X-direction, and may project from the cable guiding surface 153 in a direction away from the slider receptacle 152 (e.g., a radially outward direction). In some embodiments, the cable 108 may lie on the cable guiding surface 153 within a groove/channel 154 between the inner cam wall 157 and the outer cam wall 158.

With embodiments, the cam lever 111 may be connected to the pivot arm 112 at a cam-arm (C-A) axis 159 (see, e.g., FIGS. 3 and 9A-9C). The cam lever 111 may include a cam receptacle 161 that may be configured to receive and retain a portion of the pivot arm 112. The cam receptacle 161 may be substantially coaxial with the C-A axis 159 and may be disposed in and extend at least at least partially through the inner cam wall 157 and/or the outer cam wall 158 in the X-direction. In some embodiments, as generally illustrated in FIGS. 7A and 7B, the inner cam wall 157 may include a first portion 161A of the cam receptacle 161, and the outer cam wall 158 may include a second portion 161B of the cam receptacle 161.

In embodiments, a cam lever 111 may include a cam protrusion 162 that may project from the cam lever 111 toward the outer housing part 117 (e.g., in the X-direction). The cam protrusion 162 may be disposed substantially coaxially with the C-A axis 159 and/or may extend circumferentially around the cam receptacle 161, such as to form a cylindrical body.

With embodiments, a cam lever 111 may include a rotation stop 171 that may project from the cam lever 111 toward the outer housing part 117 (e.g., in the X-direction). The rotation stop 171 may be extend at least partially around the cam receptacle 161 and may be disposed radially farther from the C-A axis 159 than the cam protrusion 162. The rotation stop 171 may be configured such that, if the cam protrusion 162 is in the arm receptacle 170 of the pivot arm 112, a portion of the pivot arm 112 may be disposed radially between the cam protrusion 162 and the rotation stop 171. The rotation stop 171 may be configured such that a side of the pivot arm 112 abuts a surface or an end of the rotation stop 171, such as to prevent the pivot arm 112 from rotating about the C-A axis 159 any farther, which may prevent the slider 113 being adjusted any further. An end of the inner cam wall 157 and/or the outer cam wall 158 opposite the cable guiding surface 153 may include an extension portion 163 in which the cam receptacle 161, the cam protrusion 162, and/or the rotation stop 171 may be disposed. The cam receptacle 161 and the cam protrusion 162 may be disposed substantially coaxially with one another and with the C-A axis 159.

In some embodiments, the cable guiding surface 153 may be curved and may be disposed a variable distance from the C-S axis 139 and/or the slider receptacle 152 (e.g., may include a variable radius/diameter). The cable guiding surface 153 may be configured and/or shaped such that (i) an input force that is lower than the threshold force may actuate the adjustment mechanism 102, and/or (ii) fluctuation, deviation, and/or variation of the input force profile 109 is lower or less pronounced than fluctuation, deviation, and/or variation of the threshold force profile 107 (e.g., reduced/lesser slopes and/or magnitudes at some or all positions). In some embodiments, different sections 164, 165 of the cable guiding surface 153 may have one or more of a variety of shapes, sizes, and/or configurations. For example and without limitation, the different sections 164, 165 may have different shapes, may be disposed a different radial distance from the C-S axis 139, and/or may have a radius that increases/decreases at a different rate. In some embodiments, the configuration of the cable guiding surface 153 (e.g., its shape, size, radial distance from the C-S axis 139, etc.) may correspond to the threshold force profile 107 and/or the desired input force profile 109, as shown in FIG. 10. Additionally or alternatively, the configuration of the cable guiding surface 153 may differ depending on the threshold force of the adjustment mechanism 102, the variation of threshold force along the actuation trajectory (e.g., the threshold force profile 107), the desired input force, and/or the desired level of variation in the input force along the actuation trajectory (e.g., the input force profile 109) or as the slider 113 travels along the adjustment path 160.

With embodiments, such as generally illustrated in FIGS. 7A and 7B, the cable guiding surface 153 may have a first section 164 and a second section 165 which contact and/or be substantially adjacent one another. The first section 164 may be disposed a constant or variable radial distance from the C-S axis 139 and a rate of change of the radial distance may be variable or constant. In some embodiments, the radial distance of the first section 164 may decrease along a portion or an entirety of its length in a direction toward the knot receptacle 155. The second section 165 may be disposed a constant or variable radial distance from the C-S axis 139 and a rate of change of the radial distance may be variable or constant. In some embodiments, the radial distance of the second section 165 may increase along a portion or an entirety of its length in a direction toward the knot receptacle 155.

In some embodiments, the first section 164 and the second section 165 of the cable guiding surface 153 may connect at an inversion point 166, such as generally illustrated in FIGS. 7A, 7B, and 9A-9C. The inversion point 166 may additionally or alternatively be defined as the location along the cable guiding surface 153 (i) having the smallest radial distance from the C-S axis 139, and (ii) where the radial distance from the C-S axis 139 changes/inverts from decreasing in the direction of the knot receptacle 155 to increasing in the direction of the knot receptacle 155. The first section 164 may extend from the inversion point 166 to an end of the cable guiding surface 153 opposite the knot receptacle 155. The first section 164 may have a variable radial distance from the C-S axis 139 and may decrease at a first rate in the direction toward the knot receptacle 155, which may result in the radial distance between a tangent point 141 and the C-S axis 139 getting progressively smaller as the cam lever 111 rotates in the first actuation direction 178.

In embodiments, the second section 165 may extend from the inversion point 166 to the knot receptacle 155. The second section 165 may have a variable radial distance from the C-S axis 139 that may increases at a second rate in the direction toward the knot receptacle 155, which may result in the radial distance between a tangent point 141 and the C-S axis 139 getting progressively larger as the cam lever 111 rotates in the actuation direction 178. A portion 164A of the first section 164, such as at or about the end of the cable guiding surface 153 opposite the knot receptacle 155, may have the largest radial distance from the C-S axis 139 (e.g., may be the portion of the cable guiding surface 153 disposed furthest from the C-S axis 139). A portion 165A of the second section 165, such as at or about the end of the cable guiding surface 153 adjacent to the knot receptacle 155, may be disposed a larger radial distance from the C-S axis 139 than the inversion point 166.

Figure 8B:
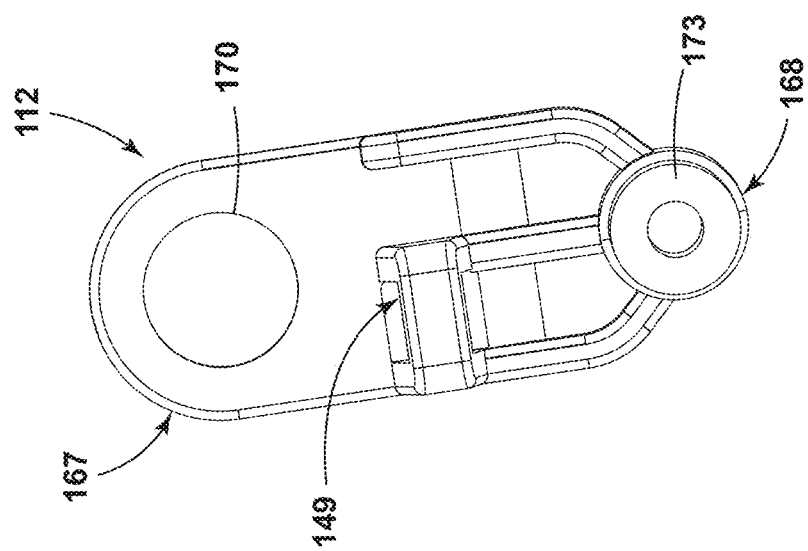
FIGS. 8A and 8B are a front view and a rear view, respectively, of an embodiment of a pivot arm of a seat adjuster according to teachings of the present disclosure.
Figure 8A:
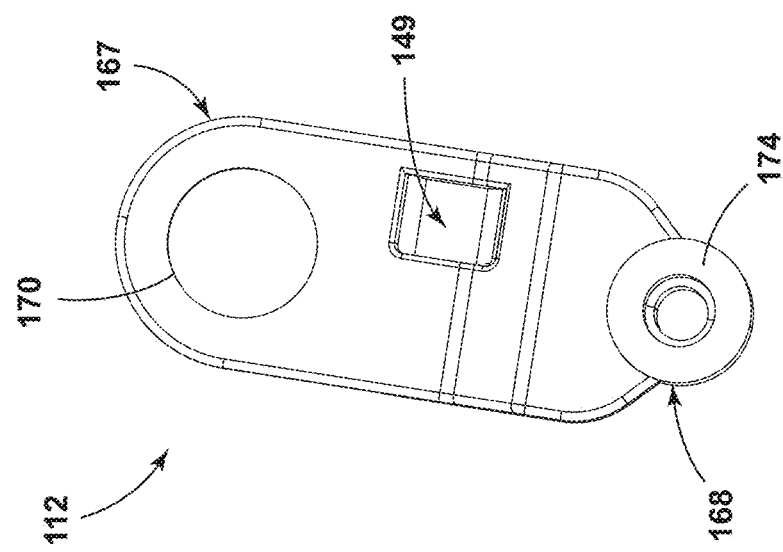

In embodiments, such as generally illustrated in FIGS. 3, 8A, and 8B, the pivot arm 112 may include an elongated body and may have a substantially rectangular shape, may have rounded corners, and/or may have curved short sides/ends. A first arm end 167 of the pivot arm 112 may be rotatably connected to the cam lever 111 at or along the C-A axis 159 such that the pivot arm 112 and the cam lever 111 are rotatable about the C-A axis 159 relative to one another. The pivot arm 112 may include an arm receptacle 170 for connecting the pivot arm 112 to the cam lever 111. The arm receptacle 170 may be disposed in a surface of the pivot arm 112 at or about the first arm end 167, may be coaxial with the C-A axis 159, and/or may be configured to receive the cam protrusion 162 of the cam lever 111. The cam protrusion 162 and the arm receptacle 170 may be configured in a complimentary manner.

With embodiments, a second arm end 168 of the pivot arm 112 may be rotatably connected to the housing 110 at or along an arm-housing (A-H) axis 172 such that the pivot arm 112 may be rotatable about the A-H axis 172 relative to housing 110. The second arm end 168 may be connected to the inner housing part 116 and/or the outer housing part 117, such as laterally adjacent to the slider 113 and/or the adjustment space 119 relative to the Y-direction. In some embodiments, the guide 127 of the outer housing part 117 may be disposed between the A-H axis 172 and the slider 113 and/or the adjustment space 119. The pivot arm 112 may include one or more arm spacers 173, 174 the may be configured for facilitating connection of the pivot arm 112 with the housing 110. The arm spacers 173, 174 may support the pivot arm 112 within the housing 110 and/or maintain the pivot arm 112 in position (e.g., relative to the X-direction). The arm spacers 173, 174 may be disposed on and/or project from a surface of the pivot arm 112 at or about the second arm end 168, may be coaxial with the A-H axis 172, and/or may be configured to be connected to at least one of the inner housing part 116 and the outer housing part 117. As generally shown in FIGS. 3, 8A, and 8B, some embodiments may include a first arm spacer 173 and a second arm spacer 174. The first arm spacer 173 and the second arm spacer 174 may be disposed at the second arm end 168, may project from opposing surfaces of the pivot arm 112 in opposite directions, may be disposed coaxially with one another and with the A-H axis 172, and/or may each be configured to be connected to the inner housing part 116 and the outer housing part 117, respectively.

In some embodiments, such as generally illustrated in FIGS. 9A-9C, the pivot arm 112 may be disposed within the housing 110 such that the first arm end 167 is disposed farther from the bearing portion 175 than the second arm end 168 relative to the Z-direction. In other words, the C-A axis 159 may be disposed farther from the bearing portion 175 than the A-H axis 172 relative to the Z-direction. The first arm end 167 may be disposed a smaller, equal, and/or larger distance from the slider 113 in the Y-direction than the second arm end 168 (e.g., the first arm end 167 may be disposed offset from the second arm end 168 relative to the Y-direction in a direction toward or away from the slider 113). The positional relationship of the first arm end 167 and the second arm end 168 relative to the Y-direction may vary along the adjustment path 160 of the slider 113. In some embodiments, the first arm end 167 may be disposed closer to the slider 113 relative to the Y-direction when the slider 113 is in a retracted position (see, e.g., FIG. 9A) and/or in an extended position (see, e.g., FIG. 9C). The first arm end 167 may be farther than the second arm end 168 from the slider 113 relative to the Y-direction when the slider 113 is disposed in a position between the retracted position and the extended position, such as at an intermediate or midpoint position generally illustrated in FIG. 9B. The first arm end 167 and the second arm end 168 may be disposed at substantially the same distance from the slider 113 relative to the Y-direction when the slider 113 is disposed in a position between the retracted position and the extended position (e.g., between the positions shown in FIGS. 9A and 9B and/or between the positions shown in FIGS. 9B and 9C).

In some embodiments, an adjustment mechanism 102 may be actuated when an input force is exerted on the seat adjuster 103. The input force may be provided, in some embodiments, when a user pulls the handle 114 in the pulling direction 181 with a sufficiently great input force. Applying the input force to the seat adjuster 103 may adjust the slider 113 along the adjustment path 160 from the retracted position toward the extended position.

In some embodiments, the slider 113 may be in a retracted position at rest/equilibrium (e.g., when the handle 114 is not actuated), such as generally illustrated in FIG. 9A. In the retracted position, the slider 113 may rest against and/or abut a bearing portion 175 of the housing 110. When the slider 113 is in the retracted position, the C-S axis 139 may be disposed at a level between the tangent point 141 and the C-A axis 159 relative to the Z-direction. In some embodiments, a threshold force associated with the adjustment mechanism 102 may be greatest when the slider 113 is in the retracted position. To offset the elevated threshold force when in the retracted position, the seat adjuster 103 may be configured such that the distance between the tangent point 141 and the C-A axis 159 is greatest than at any other point along the adjustment path 160 of the slider 113 and/or such the distance between the tangent point 141 and the C-S axis 139 may be larger than at any other point along the adjustment path 160 of the slider 113. As such, the seat adjuster 103 may provide the greatest level of transformation and/or amplification to the input force when beginning the adjustment of the slider 113 from the retracted position.

With embodiments, adjusting the slider 113 from the retracted position toward the extended position may include lifting the slider 113 off of the bearing portion 175 and sliding the slider 113 within the adjustment space 119 toward the handle opening 120. Adjusting the slider 113 along the adjustment path 160 may include guiding the slider 113 along the guide 127 via the slider groove 142. Adjusting the slider 113 along the adjustment path 160 in the pulling direction 181 may also shift the position of the tangent point 141 along the cable guiding surface 153 toward the knot receptacle 155, which may alter the amplification/transformation provided by the seat adjuster 103.

In some embodiments, a first portion 182 of the adjustment path 160 may be defined between the location of the C-S axis 139 when the slider 113 is in the retracted position, as generally illustrated in FIG. 9A, and a midpoint position, where the C-S axis 139 and the C-A axis 159 are aligned in the Y-direction as generally illustrated in FIG. 9B. In the first portion 182 of the adjustment path 160, adjusting the slider 113 in the pulling direction 181 may cause the C-S axis 139 to move in the direction of the pulling direction 181, which may cause the cam lever 111 to rotate about the C-S axis 139 in the first actuation direction 178, which may cause the cam protrusion 162 of the cam lever 111 to interact with the arm receptacle 170, which may shift the C-A axis 159 farther from the slider 113 relative to the Y-direction, which may cause the pivot arm 112 to rotate about the A-H axis 172 in a second actuation direction 179. Adjusting the slider 113 along the first portion 182 of the adjustment path 160 in the pulling direction 181 may, additionally or alternatively, (i) decrease the radial distance between the tangent point 141 and the C-S axis 139, (ii) decrease the distance between the tangent point 141 and the C-S axis 139, (iii) increase the distance between the tangent point 141 and the C-A axis 159, and (iv) increase the distance between the C-S axis 139 and the C-A axis 159 (e.g., in the Y-direction). This in turn, may reduce the level of transformation and/or amplification of the input force provided by the seat adjuster 103. The size or degree of the change in the aforementioned distances may correspond to the deviations or variations in the threshold force profile 107 of the adjustment mechanism 102. For example, as generally illustrated in in FIG. 10, the threshold force of an exemplary adjustment mechanism 102 may decrease from approximately 150 N at about 0.5 mm of the actuation trajectory to approximately 54 N at about 3.7 mm of the actuation trajectory. As such, the level of amplification of the input force provided by the seat adjuster 103 may be reduced in this region. Additionally and/or alternatively, the level of amplification may be reduced such that the rate of change in the input force is lower than the rate of change in the threshold force, which in turn may reduce the variation and/or deviation in the input force profile 109 compared to the threshold force profile 107. For example, as generally illustrated in FIG. 10, an input force of approximately 51 N at about 0.5 mm of the actuation trajectory (or at about 1.1 mm of the adjustment path 160 of the slider 113) and approximately 27 N at about 3.7 mm of the actuation trajectory (or at about 10 mm of the adjustment path 160 of the slider 113) may be sufficient to actuate the adjustment mechanism 102, despite the input force being lower than the threshold force. For example, the threshold force may decrease from 150 N to 54 N (variation of about 64%) between 0.5 mm and 3.7 mm of the trajectory path while the input force may decrease from 51 N to 27 N (variation of about 47%).

With some embodiments, a second portion 183 of the adjustment path 160 may be defined between the position of the C-S axis 139 when the slider 113 is in a midpoint position generally illustrated in FIG. 9B and the position of the C-S axis 139 when the slider 113 is in an extended position as generally illustrated in FIG. 9C. In the second portion 183 of the adjustment path 160, adjusting the slider 113 in the pulling direction 181 may cause the C-S axis 139 to move in the pulling direction 181, which may cause the cam lever 111 to rotate about the C-S axis 139 in the first actuation direction 178, which may cause the cam protrusion 162 of the cam lever 111 to interact with the arm receptacle 170, which may shift the C-A axis 159 toward the slider 113 relative to the Y-direction, which may cause the pivot arm 112 to rotate about the A-H axis 172 in a third actuation direction 180 (e.g., opposite to the second actuation direction 179). Adjusting the slider 113 in the pulling direction 181 in the second portion 183 of the adjustment path 160 may, additionally or alternatively, (i) shift the position of the tangent point 141 along the cable guiding surface 153 toward the knot receptacle 155, (ii) increase the radial distance between the tangent point 141 and the C-S axis 139, (iii) increase the distance between the tangent point 141 and the C-S axis 139, (iv) decrease the distance between the tangent point 141 and the C-A axis 159 (e.g., relative to the Y-direction), and/or (v) decrease the distance between the C-S axis 139 and the C-A axis 159 (e.g., relative to the Y-direction). One or more of these changes may increase the level of transformation and/or amplification of the input force provided by the seat adjuster 103. The size or degree of the change in the aforementioned distances may correspond to the deviations or variations in the threshold force profile 107 of the adjustment mechanism 102. For example, as generally illustrated in in FIG. 10, the threshold force of the exemplary adjustment mechanism 102 may increase from approximately 64 N at about 11.5 mm of the actuation trajectory to approximately 108 N at about 28 mm of the actuation trajectory. The level of amplification of the input force provided by the seat adjuster 103 may also be increased in this region. Additionally and/or alternatively, the level of amplification may be increased such that the rate of change in the input force is lower than the rate of change in the threshold force, which may reduce the variation and/or deviation in the input force profile 109 compared to the threshold force profile 107. As seen in the example of FIG. 10, an input force of approximately 42 N at about 11.5 mm of the actuation trajectory (or at about 22 mm of the adjustment path 160 of the slider 113) and approximately 37 N at about 28 mm of the actuation trajectory (or at about 50 mm of the adjustment path 160 of the slider 113) may be sufficient to actuate the adjustment mechanism 102, despite the input force being lower than the threshold force. Thus, the threshold force may increase from about 64 N to about 108 N (increase of about 69%) between about 11.5 mm and about 28 mm of the trajectory path while the input force may decrease from about 42 N to about 37 N (decrease of about 12%).

With embodiments, the slider 113 may be disposed at or near the handle opening 120 when in the extended position (see, e.g., FIG. 9C). In the extended position, the tangent point 141 may be at a level above of the C-S axis 139 relative to the Z-direction (e.g., disposed closer to the handle opening 120) and/or may be disposed at or about the knot receptacle 155. Additionally and/or alternatively, the tangent point 141 may be defined by knot receptacle 155 and/or the cable 108 may not contact the cable guiding surface 153. When in the extended position, the C-A axis 159 may be disposed (e.g., directly) between the A-H axis 172 and the C-S axis 139 such that a straight line extending between the A-H axis 172 and the C-S axis 139 intersects the C-A axis 159. In the extended position of the slider 113, the adjustment mechanism 102 may be fully actuated by the seat adjuster 103.

In embodiments, the slider 113 may biased toward the retracted position by the return spring 148. In such embodiments, when the input force is no longer applied to the seat adjuster 103 when the slider 113 is out of the retracted position (e.g., the handle 114 is released by the user) the return spring 148 and/or a force from the adjustment mechanism 102 may return or adjust the slider 113 to the retracted position. When being adjusted toward the retracted position along the adjustment path 160, the slider 113, the cam lever 111, and the pivot arm 112 may move and interact with one another in the opposite direction as when the slider 113 is adjusted in the pulling direction 181 from the retracted position toward extended position.

Various examples/embodiments are described herein for various apparatuses, systems, and/or methods. Numerous specific details are set forth to provide a thorough understanding of the overall structure, function, manufacture, and use of the examples/embodiments as described in the specification and illustrated in the accompanying drawings. It will be understood by those skilled in the art, however, that the examples/embodiments may be practiced without such specific details. In other instances, well-known operations, components, and elements have not been described in detail so as not to obscure the examples/embodiments described in the specification. Those of ordinary skill in the art will understand that the examples/embodiments described and illustrated herein are non-limiting examples, and thus it can be appreciated that the specific structural and functional details disclosed herein may be representative and do not necessarily limit the scope of the embodiments.

Reference throughout the specification to "examples, "in examples," "with examples," "various embodiments," "with embodiments," "in embodiments," or "an embodiment," or the like, means that a particular feature, structure, or characteristic described in connection with the example/embodiment is included in at least one embodiment. Thus, appearances of the phrases "examples, "in examples," "with examples," "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more examples/embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of examples/embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

All matter contained in the above description or shown in the accompanying drawings shall be interpreted as illustrative only and not limiting. Changes in detail or structure may be made without departing from the present disclosure.

What is claimed is:

1. A seat adjuster, comprising:
a slider;
a cam lever rotatably connected to the slider about a cam-slider axis such that the cam lever is configured to pivot about the cam-slider axis with adjustment of the slider; and
a pivot arm including a first arm end and a second arm end;
wherein the first arm end is rotatably connected to the cam lever about a cam-arm axis such that, with adjustment of the slider, (i) the cam lever pivots about the cam-arm axis and (ii) the pivot arm pivots about an arm-housing axis extending through the second arm end.

2. The seat adjuster according to claim 1, wherein the cam lever has a cable guiding surface configured to contact a cable.

3. The seat adjuster according to claim 2, wherein:
the slider is adjustable along an adjustment path via a handle with the exertion of an input force on the handle;
a minimum input force sufficient to adjust the slider varies along the adjustment path and defines an input force profile; and
the cable guiding surface has a curvature configured to amplify the input force and reduce variation in the input force profile.

4. The seat adjuster according to claim 1, including a housing having an adjustment space, wherein the slider is adjustably disposed at least partially within the adjustment space.

5. The seat adjuster according to claim 4, wherein the slider, a handle, the cam lever, and the pivot arm are at least partially disposed within the housing.

6. The seat adjuster according to claim 5, wherein the second arm end is rotatably connected to the housing at or about the arm-housing axis.

7. The seat adjuster according to claim 1, including a housing; wherein:
the slider includes a groove;
the housing includes a guide; and
the guide is engaged with the groove such that the slider is adjustable along the guide.

8. The seat adjuster according to claim 7, wherein the guide includes a stop disposed proximate to a top of the housing and configured to prevent removal of the slider from the housing.

9. The seat adjuster according to claim 1, including a housing; wherein:
the housing includes a handle opening;
a handle connected to the slider, the handle projecting out of the housing through the handle opening; and
the slider, the cam lever, and the pivot arm are disposed at least partially within the housing such that (i) the cam-arm axis is disposed at a vertical level between the cam-slider axis and the handle opening when the slider is in a retracted position, and (ii) the cam-slider axis is disposed at a vertical level between the cam-arm axis and the handle opening when the slider is in an extended position.

10. The seat adjuster according to claim 9, wherein a lateral distance between the cam-slider axis and the cam-arm axis decreases and then subsequently increases as the slider is adjusted from the retracted position to the extended position.

11. The seat adjuster according to claim 1, wherein:
the cam lever includes an inner cam wall and an outer cam wall extending parallel to one another;
the cam lever includes a cable guiding surface extending between and connecting the inner cam wall and the outer cam wall; and
the inner cam wall, the outer cam wall, and the cable guiding surface are configured such that a cable is extendable at least partially along the cable guiding surface between the inner cam wall and the outer cam wall.

12. The seat adjuster according to claim 11, wherein:
at least one of the inner cam wall and the outer cam wall include a cam protrusion projecting therefrom that is substantially coaxial with the cam-arm axis;
the first arm end includes an arm receptacle disposed coaxial to the cam-arm axis; and
the cam protrusion engages the arm receptacle connecting the pivot arm and the cam lever.

13. The seat adjuster according to claim 11, wherein:
the cam lever includes a slider receptacle configured to receive a portion of the slider; and
the slider receptacle is coaxial with the cam-slider axis.

14. The seat adjuster according to claim 13, wherein:
a cam protrusion of the cam lever is engaged in an arm receptacle of the pivot arm;
the cam protrusion and the arm receptacle are substantially coaxial with the cam-arm axis; and
the slider receptacle and the cam protrusion are disposed on opposite sides of the cable guiding surface.

15. The seat adjuster according to claim 1, wherein the cam lever includes a cable knot receptacle configured to receive a cable knot of a cable.

16. The seat adjuster according to claim 1, wherein:
the slider is adjustable along an adjustment path via an input force;
a minimum input force sufficient to adjust the slider varies along the adjustment path and defines an input force profile; and
the slider, the cam lever, and the pivot arm are configured as a scotch yoke mechanism configured to, via rotation of the cam lever and the pivot arm, amplify the input force and reduce variation in the input force profile.

17. A vehicle, comprising:
a seat, including:
an adjustment mechanism configured to adjust the seat;
the seat adjuster according to claim 1; and
a cable operatively connecting the seat adjuster to the adjustment mechanism;
wherein the slider is adjustable along an adjustment path to control movement of the cable and actuate the adjustment mechanism; a minimum of an input force to adjust the slider varies along the adjustment path of the slider and defines an input force profile; and the cam lever has a cable guiding surface configured to, via rotation of the cam lever and the pivot arm, amplify the input force and reduce variation in the input force profile.

18. The vehicle according to claim 17, wherein:
the adjustment mechanism is actuatable when a threshold force is applied to the adjustment mechanism via the seat adjuster;
the threshold force varies along the adjustment path of the slider and defines a threshold force profile; and
the cable guiding surface is configured such that the input force profile has a lesser slope and a lesser magnitude than the threshold force profile along the adjustment path.

19. The vehicle according to claim 18, wherein the threshold force profile includes a maximum of at least 150

N; and the seat adjuster is configured such that the input force profile has a maximum of about 51 N.

20. A seat adjuster, comprising:

a housing including a handle opening;

a slider adjustably disposed within the housing, the slider adjustable to a retracted position and an extended position;

a handle connected to the slider via which the slider is adjustable, at least a portion of the handle projecting from the housing via the handle opening;

a cam lever rotatably connected to the slider at or about a cam-slider axis such that the cam lever pivots about the cam-slider axis when the slider is adjusted; and a pivot arm having a first arm end and a second arm end disposed opposite one another; the first arm end rotatably connected to the cam lever at a cam-arm axis such that the cam lever pivots about the cam-arm axis when the slider is adjusted; the second arm end rotatably connected to the housing at or about an arm-housing axis such that the pivot arm pivots about the arm-housing axis when the slider is adjusted;

wherein the slider, the cam lever, and the pivot arm are disposed such that (i) the cam-arm axis is disposed at a vertical level between the cam-slider axis and the handle opening when the slider is in the retracted position, and (ii) the cam-slider axis is disposed at a vertical level between the cam-arm axis and the handle opening when the slider is in the extended position.

* * * * *